US007958525B2

(12) United States Patent
Karaoguz et al.

(10) Patent No.: US 7,958,525 B2
(45) Date of Patent: Jun. 7, 2011

(54) DEMAND BROADCAST CHANNELS AND CHANNEL PROGRAMMING BASED ON USER VIEWING HISTORY, PROFILING, AND REQUESTS

(75) Inventors: Jeyhan Karaoguz, Irvine, CA (US); James D. Bennett, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 1286 days.

(21) Appl. No.: 10/675,466

(22) Filed: Sep. 30, 2003

(65) Prior Publication Data

US 2004/0117816 A1 Jun. 17, 2004

Related U.S. Application Data

(60) Provisional application No. 60/478,552, filed on Jun. 13, 2003, provisional application No. 60/432,472, filed on Dec. 11, 2002, provisional application No. 60/443,894, filed on Jan. 30, 2003.

(51) Int. Cl.
*H04N 7/16* (2006.01)
(52) U.S. Cl. ............. 725/14; 725/13; 725/16; 725/119; 725/138
(58) Field of Classification Search ................ 725/34, 725/35, 45, 46, 137–138, 13–16
See application file for complete search history.

(56) References Cited

U.S. PATENT DOCUMENTS

| 5,351,075 | A | * | 9/1994 | Herz et al. | 725/13 |
| 5,914,712 | A | * | 6/1999 | Sartain et al. | 725/9 |
| 6,029,195 | A | * | 2/2000 | Herz | 725/116 |
| 7,065,778 | B1 | * | 6/2006 | Lu | 725/98 |
| 2003/0018745 | A1 | * | 1/2003 | McGowan et al. | 709/217 |
| 2003/0221191 | A1 | * | 11/2003 | Khusheim | 725/35 |
| 2004/0103437 | A1 | * | 5/2004 | Allegrezza et al. | 725/95 |

* cited by examiner

*Primary Examiner* — Hunter B. Lonsberry
*Assistant Examiner* — Sumaiya A Chowdhury
(74) *Attorney, Agent, or Firm* — McAndrews, Held & Malloy, Ltd.

(57) ABSTRACT

A system and method for scheduling media for consumption via a demand broadcast channel based upon notifications received during user consumption of media. An embodiment of the present invention may employ notifications generated when users select media for consumption, to calculate one or more statistics. The statistics may be calculated and used by a media provider to schedule media into a demand broadcast channel in which the frequency of repetition or time of availability of the media is set according to a ranking of the relative frequency of requests for the media. The statistics may also be shared with a third party, to enable a third party media provider to arrange the scheduling of media availability according to the relative frequency of requests for the media.

32 Claims, 15 Drawing Sheets

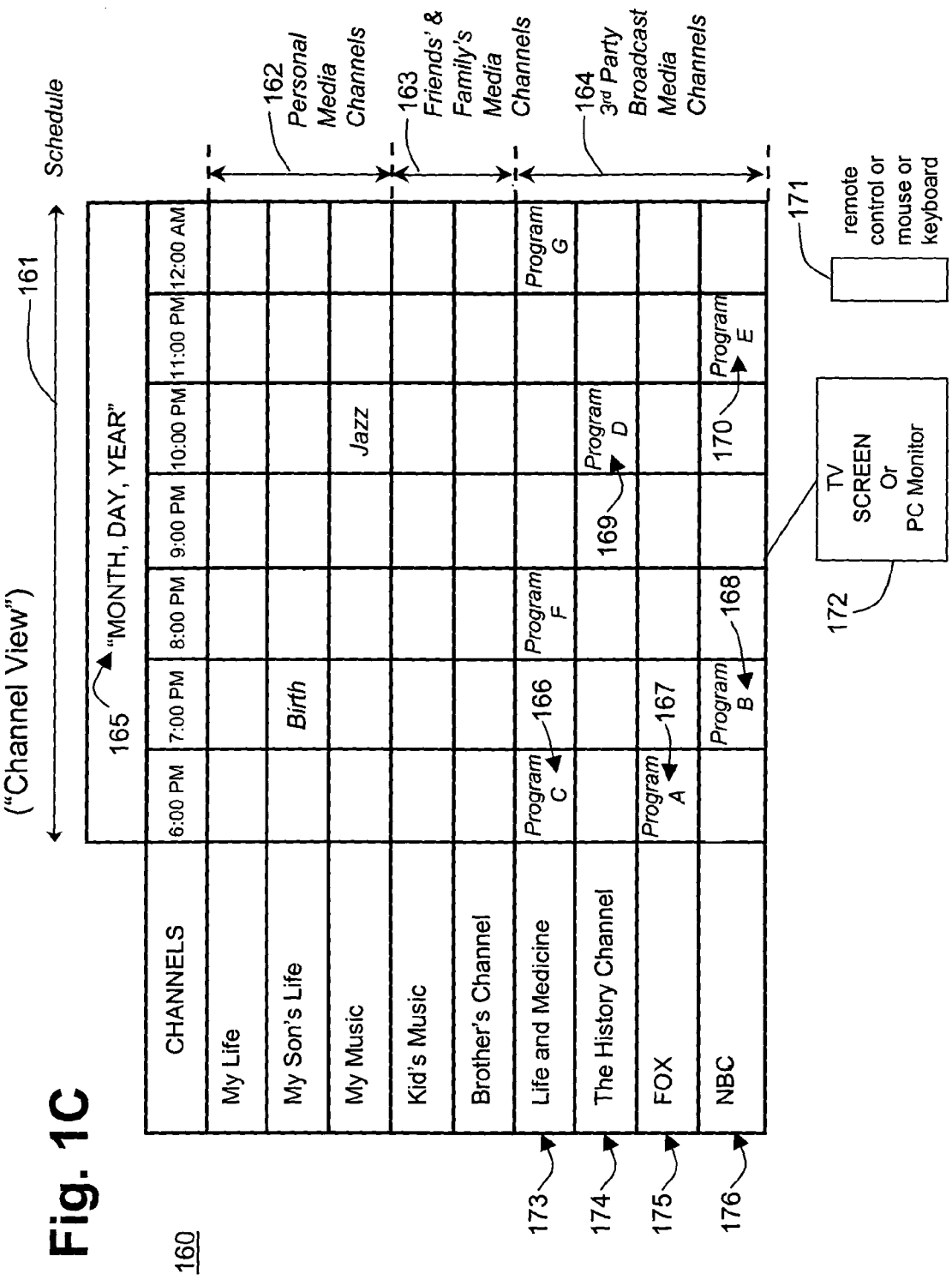

| CHANNEL LINE UP | <<1PM | 2PM | HOUR, DAY ... | 6PM | 7PM> |
|---|---|---|---|---|---|
| FAMILY VACATIONS | | | | | |
| KID's SPORTS | | | | | |
| ... | | | | | |
| VACATION in ALASKA VIDEO <u>802</u> | Normal Estimated Delivery Time: 2 hrs 13 min Cost: 59c (without Queuing) | | | Showing All Day (48 Min), Earliest Order Time: 4:00PM MPEG-2 1.5 Mbps | |
| VACATION in ALASKA VIDEO <u>803</u> | Express Estimated Delivery Time: 18 min Cost: $1.2 (with Queuing) | | | Showing All Day (48 Min), Earliest Order Time: 4:00PM MPEG-2 4 Mbps | |
| VACATION in ALASKA VIDEO <u>804</u> | Overnight Delivery: Avail. Nxt Morning Cost: 5c (Server Stored) | | | Showing All Day (48 Min), Earliest Order Time: 4:00PM MPEG-2 19 Mbps | |

800

801 (brace grouping the three VACATION in ALASKA VIDEO rows)

Fig. 8

DEMAND BROADCAST CHANNELS AND CHANNEL PROGRAMMING BASED ON USER VIEWING HISTORY, PROFILING, AND REQUESTS

CROSS-REFERENCE TO RELATED APPLICATIONS/INCORPORATION BY REFERENCE

This application makes reference to, claims priority to, and claims the benefit of U.S. Provisional Patent Application Ser. No. 60/478,552, entitled "Demand Broadcast Channels And Channel Programming Based On User Viewing History, Profiling, And Requests", filed Jun. 13, 2003, U.S. Provisional Application Ser. No. 60/432,472, entitled "Personal Inter-Home Media Exchange Network", filed Dec. 11, 2002, and U.S. Provisional Application Ser. No. 60/443,894, entitled "Personal Access And Control Of Media Peripherals On A Media Exchange Network", filed Jan. 30, 2003, the complete subject matter of which are hereby incorporated herein by reference, in their entirety.

In addition, the applicants hereby incorporate the complete subject matter herein by reference, in their entirety, of U.S. Provisional Patent Application Ser. No. 60/478,286, entitled "Media Processing System Communicating Activity Information To Support User And User Base Profiling And Consumption Feedback", filed Jun. 13, 2003, U.S. Provisional Patent Application Ser. No. 60/448,705, entitled "Media Exchange Network With Media Guide Interface", filed Feb. 18, 2003, U.S. Provisional Patent Application Ser. No. 60/457,179, entitled "Server Architecture Supporting A Personal Media Exchange Network", filed Mar. 25, 2003, U.S. patent application Ser. No. 10/657,390, entitled "Personal Inter-Home Media Exchange Network", filed Sep. 8, 2003, and U.S. patent application Ser. No. 10/660,267, entitled "Personal Access And Control Of Media Peripherals On A Media Exchange Network", filed Sep. 11, 2003.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

In general, the program schedules of broadcast and cable television channels are planned weeks or months in advance of being put into effect. The selection of program materials and the sequence in which they are broadcast are based upon a number of factors including, for example, the subject matter, the target audience, the length of the program, an estimate of its audience acceptance, and the nature and popularity of programs in competing time slots. Adjustments in day and time of broadcast are sometimes made when the original schedule proves unsuitable, or when other program offerings are better suited for that time period.

When adjustments in program schedules are made, they are generally made using the same process used to create the original schedule based upon user polls and decisions by programming professionals. This process is slow to respond and is not suited to the rebroadcast of popular program content.

New subscribers to cable and video-on-demand (pay-per-view) services are normally asked to choose from an assortment of channel or viewing selections. If they are new to the cable service or programming provider, they may be unaware of the nature of the programs and may be unable to effectively choose the channel or program selections that they are most likely to enjoy. The delay in the availability of program ratings made using current processes may provide little support for the selection of program and service options.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be found in a method supporting communication of activity information to enable media programming. Such a method may comprise receiving, via a communication network, at least one notification of a user request for consumption of media, and each of the at least one notification may comprise information related to the request. An embodiment of the present invention may comprise calculating at least one statistic using the information related to the request, and identifying media using the at least one statistic. In addition, an embodiment of the present invention may comprise scheduling the identified media according to the at least one statistic for consumption via the communication network, and updating a user interface with the scheduled identified media. The information related to the request may comprise at least one of an Internet protocol (IP) address, a media access control (MAC) address, an electronic serial number (ESN), a title, a subject, a time period, a genre, an artist, a media channel type, a mode, a language, and a user identifier. The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure, and the communication network may be the Internet.

In an embodiment in accordance with the present invention, the media may comprise at least one of audio, a still image, video, real time video, and data, and consumption may comprise at least one of playing audio, displaying a still image, displaying video, and displaying data. At least one of the calculating, identifying, scheduling, and updating may be performed on a periodic basis, and the at least one statistic may be a ranking of the relative frequency of consumption of media.

Additional aspects of the present invention may be seen in a method supporting communication of activity information to enable media programming. An embodiment in accordance with the present invention may comprise receiving, via a communication network, at least one notification of a user request for consumption of media. Each of the at least one notification may comprise information related to the request. Such a method may also comprise calculating at least one statistic using the information related to the request, identifying media using the at least one statistic, and communicating at least one of the identified media and the at least one statistic to a provider of the media, via the communication network. The information related to the request may comprise at least one of an Internet protocol (IP) address, a media access control (MAC) address, an electronic serial number (ESN), a title, a subject, a time period, a genre, an artist, a media channel type, a mode, a language, and a user identifier.

In an embodiment of the present invention, the communication network may comprise at least one of a cable infrastructure, a satellite network infrastructure, a digital subscriber line (DSL) infrastructure, an Internet infrastructure, an intranet infrastructure, a wired infrastructure, and a wireless infrastructure, and the communication network may be the Internet. The media may comprise at least one of audio, a still image, video, real time video, and data, and consumption may comprise at least one of playing audio, displaying a still image, displaying video, and displaying data. In addition, at least one of the calculating, identifying, and communicating may be performed on a periodic basis, and the at least one statistic may be a ranking of the relative frequency of consumption of media.

Yet other aspects of the present invention may be observed in a system supporting communication of activity information to enable media programming. Such a system may comprise a television display, a storage for storing media, a user interface accessible via the television display, and set top box circuitry communicatively coupling the storage to a communication network to support consumption of the selected media. The storage may have an associated network address and the user interface may support the selection of media for consumption. An embodiment of the present invention may comprise server software that receives, via the communication network, a notification comprising at least one of the associated network address and information related to the media selected for consumption. The server software may respond by calculating at least one statistic.

The media in an embodiment of the present invention may comprise at least one of audio, a still image, video, real time video, and data, and consumption may comprise at least one of playing audio, displaying a still image, displaying video, and displaying data. In various embodiments of the present invention, the associated network address may be one of an Internet protocol (IP) address, a media access control (MAC) address, and an electronic serial number (ESN). The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. In an embodiment in accordance with the present invention, the information related to media selected for consumption may comprise at least one of a title, a subject, a time period, a genre, an artist, a media channel type, a mode, a language, and a user identifier. The at least one statistic may be a ranking of the relative frequency of consumption of media.

An embodiment of the present invention may comprise server software that schedules the availability of media, based upon the at least one statistic, and the server software may perform the scheduling the availability of media on a periodic basis. Another embodiment of the present invention may comprise server software that shares, with a third party, the at least one statistic.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1C illustrates an exemplary media guide interface (a.k.a., "channel view"), in accordance with an embodiment of the present invention.

FIG. 8 is an exemplary illustration of a media guide user interface showing several options of a pushed media in accordance with an embodiment of the present invention.

DETAILED DESCRIPTION OF THE INVENTION

Certain embodiments of the present invention relate to the monitoring of television viewer behavior and the scheduling of entertainment programming choices. In particular, certain embodiments of the present invention employ user activity information to enable the creation, scheduling, and distribution of demand broadcast channels based upon user viewing history, profiling, and requests.

Figure 1A:
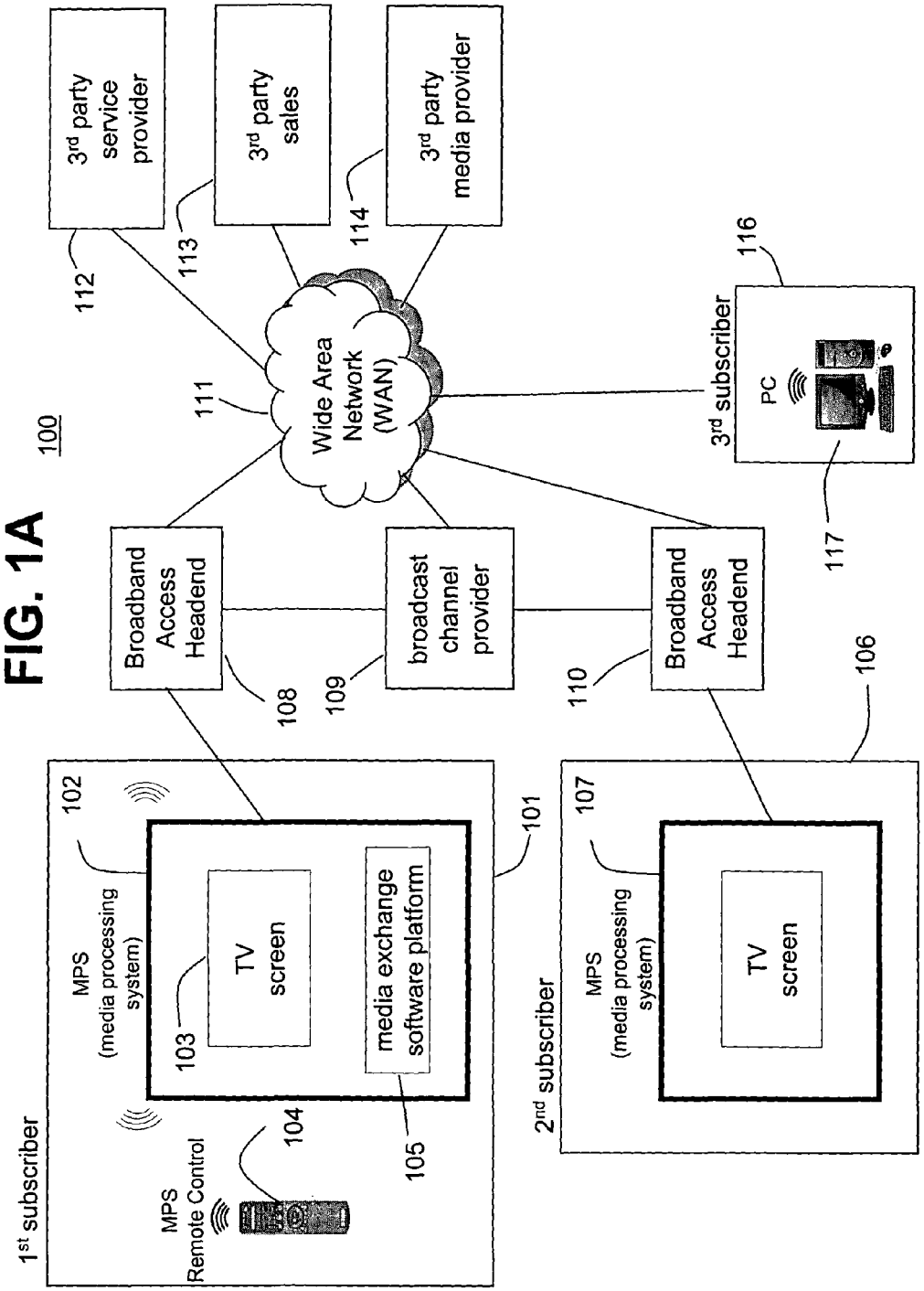
FIG. 1A is a diagram illustrating a media exchange network in which an embodiment of the present invention may be practiced.

FIG. 1A is a diagram illustrating a media exchange network 100 in which an embodiment of the present invention may be practiced. The media exchange network 100 is a communication network comprising a MPS (media processing system) 102 at a $1^{st}$ subscriber 101, a MPS 107 at a $2^{nd}$ subscriber 106, and a PC 117 at a third subscriber 116. The MPS 102 is connected to broadband access headend 108 which connects to WAN infrastructure 111. Likewise, the MPS 107 is connected to broadband access headend 110 which provides connectivity to WAN infrastructure 111. The media exchange network 100 further comprises a $3^{rd}$ party service provider 112, a $3^{rd}$ party sales provider 113, a $3^{rd}$ party media provider 114, and a broadcast channel provider 109. Wide-area network (WAN) infrastructure 111 provides connectivity between the MPS's 102 and 107, and the PC 117, and permits access to $3^{rd}$ party service provider 112, $3^{rd}$ party sales provider 113, $3^{rd}$ party media provider 114, and broadcast channel provider 109. The WAN infrastructure 111 may comprise, for example, cable infrastructure, a satellite network infrastructure, a digital subscriber line (DSL) infrastructure, an Internet infrastructure, an intranet infrastructure, a wired infrastructure, and a wireless infrastructure, or any combination of the above. The fact that illustration of FIG. 1A shows two MPS's 102 and 107, and a single PC 117 is not intended to represent a limitation of the present invention. The media exchange network 100 may comprise any number of MPS's and PC's without departing from the spirit and scope of the present invention. Each of the entities within the media exchange network 100 may be identified using a network or protocol address such as, for example, an Internet protocol (IP) address, a media access control (MAC) address, and an electronic serial number (ESN).

The MPS's (102 and 107) may be, for example, enhanced set-top-boxes. The MPS's (102 and 107) may each include a TV screen such as the TV screen 103 of the MPS 102 for viewing and interacting with various user interfaces, media, data, and services that are available on the media exchange network 100 using, for example, a remote control such as the remote control 104 associated with the MPS 102. The PC 117 may include a PC monitor for viewing and interacting with various user interfaces, media, data, and services that are available on the media exchange network using, for example, a keyboard and mouse. The MPS's (102 and 107), and the PC 117 include functional software to support interaction with the various elements of the media exchange network 100, in accordance with various embodiments of the present invention.

In accordance with various embodiments of the present invention, a MPS may comprise a set-top-box (STB), a PC, or a TV with a media management system (MMS). A MMS is also known herein as a media exchange software (MES) platform.

A MMS comprises a software platform operating on at least one processor to provide certain functionality including user interface functionality, distributed storage functionality, and networking functionality. For example, a MMS may provide control of media peripheral devices, status monitoring of media peripheral devices, and inter-home MPS routing selection, in accordance with an embodiment of the present invention.

For example, the MPS's (102 and 107) and the PC 117 comprise a media exchange software (MES) platform 105. Further details of a media exchange software platform are provided below with respect to FIG. 3. The MES platform 105 on the MPS 102, and similarly the MES platforms on MPS 107 and PC 117, support personalized views of media channels and the set up of new media channels on the media exchange network 100. For example, the MES platform 105 provides a format, displayed on a monitor of the MPS 102, comprising a media guide user interface, or "channel view", to allow a user to set up a personalized view of the media guide user interface using a remote control 104. An example media guide user interface is described in U.S. Provisional Patent Application Ser. No. 60/448,705, entitled "Media Exchange Network With Media Guide Interface", filed Feb. 18, the complete subject matter of which is hereby incorporate herein by reference, in its entirety. The MES platform 105 also provides the functionality for a user of the MPS 102 to set up one or more media channels in his personalized view.

In general, the MPS's (102 and 107) and the PC 117 each include a media exchange software (MES) platform and a networking component for connectivity. The MES platform provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface with a TV channel guide look-and-feel.

Figure 1B:
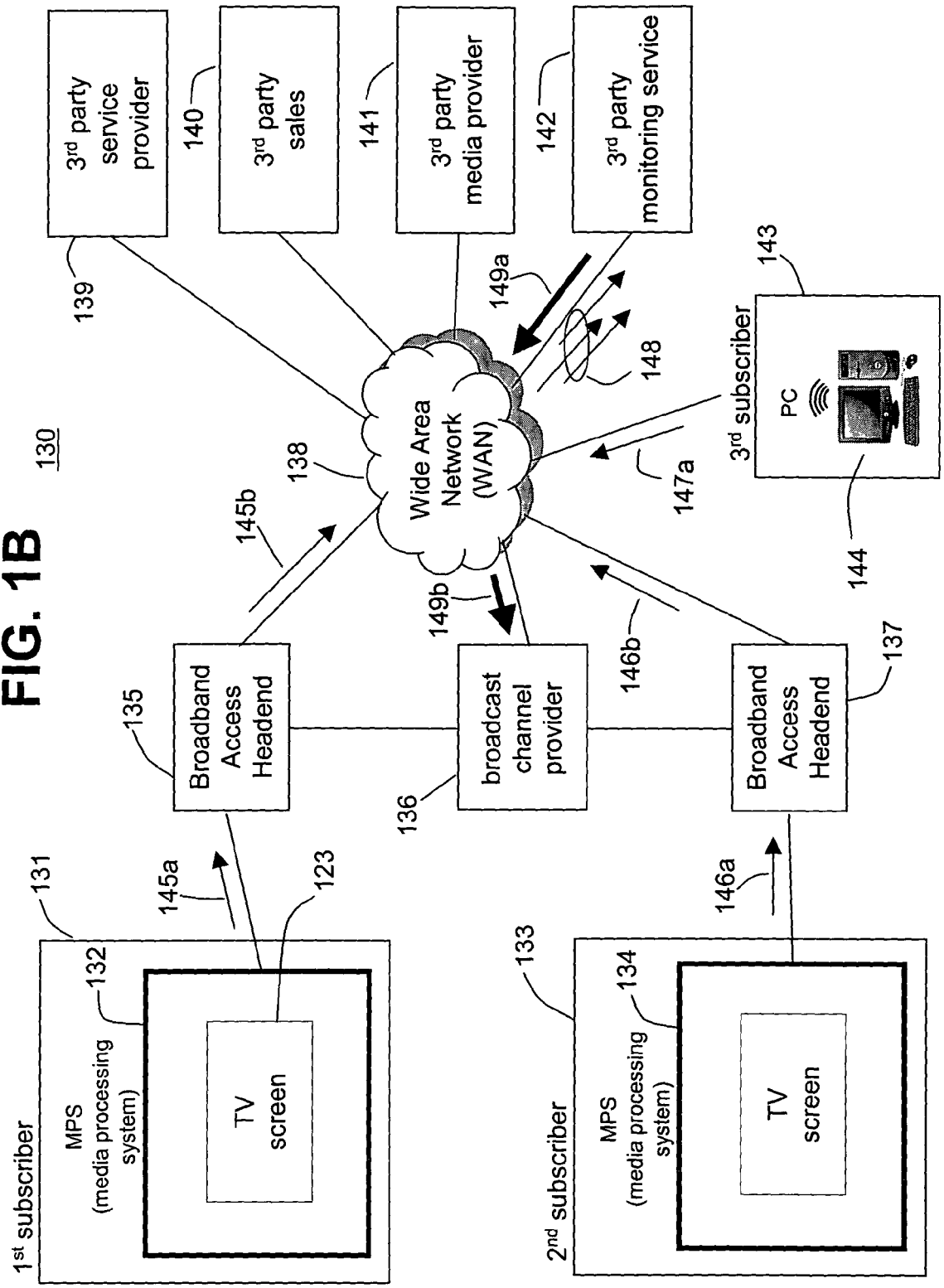
FIG. 1B is a diagram illustrating an exemplary embodiment of a media exchange network supporting demand broadcast channels and channel programming based on user viewing history, profiling, and requests, in accordance with the present invention.

FIG. 1B is a diagram illustrating an exemplary embodiment of a media exchange network 130 supporting demand broadcast channels and channel programming based on user viewing history, profiling, and requests, in accordance with the present invention. Similar to the media exchange network 100 of FIG. 1A, the media exchange network 130 of FIG. 1B comprises a MPS 132 at a 1st subscriber 131, a MPS 134 at a $2^{nd}$ subscriber 133, and a PC 144 at a $3^{rd}$ subscriber 143. The media exchange network 130 further comprises a $3^{rd}$ party service provider 139, a $3^{rd}$ party sales provider 140, a $3^{rd}$ party media provider 141, and a broadcast channel provider 136. The wide-area network (WAN) infrastructure 138 provides connectivity between the MPS's 132, 134 and the PC 139, and permits access to $3^{rd}$ party service provider 139, $3^{rd}$ party sales provider 140, and $3^{rd}$ party media provider 141. As is the case for WAN infrastructure 111, above, the WAN infrastructure 138 may comprise, for example, cable infrastructure, a satellite network infrastructure, a digital subscriber line (DSL) infrastructure, an Internet infrastructure, an intranet infrastructure, a wired infrastructure, and a wireless infrastructure, or any combination of the above. Although the illustration of FIG. 1B shows a particular complement of MPS's and PC's, the present invention is not limited in this regard.

As in the exemplary media exchange network of FIG. 1A, the MPS's (132 and 134) of FIG. 1B may be, for example, enhanced set-top-boxes and may each include a TV screen and a remote control, such as the TV screen 102 and remote control 104 of the MPS 102 in FIG. 1A. The PC 144 may include a PC monitor, a keyboard, and mouse. The MPS's 132 and 134, and the PC 144 include functional software to support interaction with the various elements of the media exchange network 130, in accordance with various embodiments of the present invention.

In addition to the elements described above, the media exchange network of FIG. 1B comprises a $3^{rd}$ party monitoring service 142. The $3^{rd}$ party monitoring service 142 is connected to the WAN infrastructure 138, which provides connectivity to the MPS's 132, 134 of the $1^{st}$ and $2^{nd}$ subscribers 131, 133, respectively, the PC 144 of the $3^{rd}$ subscriber 143, and the $3^{rd}$ party service provider 139, the $3^{rd}$ party sales provider 140, and the $3^{rd}$ party media provider 141. An example of a $3^{rd}$ party monitoring service such as $3^{rd}$ party monitoring service 142 may be found in U.S. Provisional Patent Application Ser. No. 60/478,286, entitled "Media Processing System Communicating Activity Information To Support User And User Base Profiling And Consumption Feedback", filed Jun. 13, 2003, the complete subject matter of which is hereby incorporate herein, in its entirety.

In the exemplary media exchange network 130 of FIG. 1B, each activity by a media exchange network 130 user entity that results in the consumption of media channel content, such as the media channels exposed by $3^{rd}$ party service provider 139, $3^{rd}$ party sales provider 140, or $3^{rd}$ party media provider 141, or broadcast channel provider 136, initiates the transmission of activity information to the $3^{rd}$ party monitoring service 142. It is a function of $3^{rd}$ party monitoring service 142 to process the activity information from subscriber terminals such as, for example, the MPS's 132, 134 or the PC 144 of FIG. 1B, for later use by those organizations that may have interest in media channel access and consumption. In the example of FIG. 1B, the user activity information is transmitted to broadcast channel provider 136, to support the creation of one or more demand broadcast channels. Additional details of the nature of demand broadcast channels will be provided below, with relation to FIGS. 1C and 1D.

The following example illustrates a process by which user activity information is generated and collected, with reference to FIG. 1B. In FIG. 1B, the $1^{st}$ subscriber 131 selects one of the media channels listed on their personal media guide user interface, as displayed on the TV screen 123 of the MPS 132. This selection may be performed using, for example, a remote control such as the remote control 104 of FIG. 1A. For the purposes of this example, let us assume that the selected media channel was exposed by the broadcast media provider 136, and that broadcast media provider 136 is the designated information recipient of any activity information related to media channel(s) exposed by broadcast media provider 136. The designation of an information recipient of activity information may be made through an activity monitor parameters screen (not shown) displayed on the TV screen 123 of the MPS 132. An example of one embodiment of an activity monitor parameters screen is shown and described in U.S. Provisional Patent Application Ser. No. 60/478,286, entitled "Media Processing System Communicating Activity Information To Support User And User Base Profiling And Consumption Feedback", filed Jun. 13, 2003, the complete substance of which is hereby incorporated herein by reference, in its entirety.

In an embodiment in accordance with the present invention, the act of selecting a media channel for consumption may cause the MPS 132 to examine the characteristics of the selected media channel, to determine whether activity information about the selected media channel access should be transmitted to, for example, the $3^{rd}$ party monitoring service 142. If the characteristics of the selected media channel and other factors such as, for example, the time-of-day or date, are determined to be appropriate, the MPS 132 transmits the activity information 145a to the designated information recipient via media exchange network 130. In this example, the information recipient for the MPS's 132, 134, and the PC 144 is $3^{rd}$ party monitoring service 142. The activity information 145a from $1^{st}$ subscriber 131, along with, for example, the activity information 146a from the $2^{nd}$ subscriber 133, and the activity information 147a from the $3^{rd}$ subscriber 143, are delivered via WAN infrastructure 138 to the $3^{rd}$ party monitoring service 142 as part of activity information stream 148. The $3^{rd}$ party monitoring service 142 processes the incoming activity information stream 148, and transmits the processed activity information 149a to the WAN infrastructure 138, which delivers it to broadcast media provider 136 as processed activity information 149b.

FIG. 1C illustrates an exemplary media guide interface 160 (a.k.a., "channel view"), in accordance with an embodiment of the present invention. The illustration of FIG. 1C shows a media guide interface 160 in a tabular format comprising rows representing media channels, and columns containing program schedule information 161. The media guide interface 160 is suitable for display on a TV screen or PC monitor, such as TV screen 172. Included in media guide interface 160 are three "Personal" media channels 162, two "Friend's and Family's" media channels 163, and four "$3^{rd}$ Party Broadcast" media channels 164. The media guide interface 160 also comprises a time period indication 165 of the "month", "day", and "year" for which the media guide screen 160 is defined. Note that media guide interface 160 may be defined in units other than that shown, for example, "week" and "year", "month" and "day", "week" and "day of week", without departing from the spirit of the present invention. In the example of FIG. 1C, media guide interface 160 encompasses the time period from 6:00 PM to 12:00 AM on the date indicated by time period indication 165.

As described above, the media guide interface 160 of FIG. 1C includes $3^{rd}$ party broadcast media channels 164 comprising broadcast media channels "Life and Medicine" 173, "The History Channel" 174, "FOX" 175, and "NBC" 176. Each of these broadcast media channels have their own broadcast schedules. For example, the broadcast media channel "Life and Medicine" 173 has "Program C" 166 scheduled for broadcast at 6:00 PM, and "The History Channel" 174 has "Program D" 169 scheduled for broadcast at 10:00 PM. The broadcast media channel "FOX" 175 has "Program A" 167" scheduled for broadcast at 6:00 PM, while "NBC" 176 has "Program B" 168 scheduled for broadcast at 7:00 PM and "Program E" 170 scheduled for broadcast at 11:00 PM.

Figure 1D:
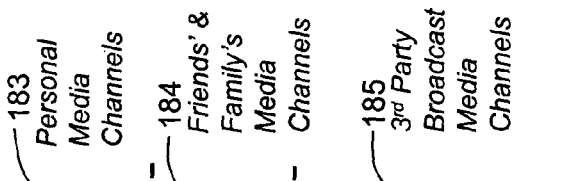
FIG. 1D is a diagram illustrating an exemplary embodiment of a media guide interface similar to the media guide interface of FIG. 1C, but to which has been added two demand broadcast channels, "Demand Broadcast Channel #1" and "Demand Broadcast Channel #2", in accordance with the present invention.

FIG. 1D is a diagram illustrating an exemplary embodiment of a media guide interface 180 similar to the media guide interface 160 of FIG. 1C, but to which has been added two demand broadcast channels, "Demand Broadcast Channel #1" 193 and "Demand Broadcast Channel #2" 194, in accordance with the present invention. The illustration of FIG. 1D shows a media guide interface 180 in a tabular format comprising rows representing media channels, and columns containing program schedule information 181. The media guide interface 180 is suitable for display on a TV screen or PC monitor, such as TV screen 172 of FIG. 1C. Included in media guide interface 180 are three "Personal" media channels 183, two "Friend's and Family's" media channels 184, and four "$3^{rd}$ Party Broadcast" media channels 185. The media guide interface 180 also comprises a time period indication 186 of the "month", "day", and "year" for which the media guide screen 180 is defined. Note that media guide interface 180 may be defined in units other than that shown, for example, "week" and "year", "month" and "day", "week" and "day of week", without departing from the spirit of the invention. As in the example of FIG. 1C, media guide interface 180 encompasses the time period from 6:00 PM to 12:00 AM on the date indicated by time period indication 186.

The media guide interface 180 of FIG. 1D includes $3^{rd}$ party broadcast media channels 185 comprising broadcast media channels "Life and Medicine" 195, "The History Channel" 196, "FOX" 197, and "NBC" 198. Each of these broadcast media channels have their own broadcast schedules. For example, the broadcast media channel "Life and Medicine" 195 has "Program C" 187 scheduled for broadcast at 6:00 PM, and "The History Channel" 196 has "Program D" 191 scheduled for broadcast at 10:00 PM. The broadcast media channel "FOX" 197 has "Program A" 188 scheduled for broadcast at 6:00 PM, while "NBC" 198 has "Program B" 189 scheduled for broadcast at 7:00 PM and "Program E" 192 scheduled for broadcast at 11:00 PM.

Let us assume that the activity information received and processed by a $3^{rd}$ party monitoring service such as the $3^{rd}$ party monitoring service 142 of FIG. 1B indicates that the most popular program carried by $3^{rd}$ party broadcast channels 195, 196, 197, and 198 of FIG. 1D is "Program D" 191, followed in decreasing order of popularity by "Program A" 188, "Program C" 187, "Program E" 192, and "Program B" 189. In one embodiment of the present invention, a broadcast channel provider such as broadcast channel provider 136 of FIG. 1B may employ such processed activity information to create demand broadcast channels, such as "Demand Broadcast Channel #1" 193 and "Demand Broadcast Channel #2" 194. The demand broadcast channels 193, 194 may each comprise a sequence of program materials selected from the $3^{rd}$ party broadcast channels 185, according to the popularity of the program materials as determined from user activity information.

For example, in the illustration of FIG. 1D, the demand broadcast channel "Demand Broadcast Channel #1" 193 comprises a sequence of program materials starting with the most popular program, "Program D" at 7:00 PM, followed by the next most popular program, "Program A" at 8:00 PM, followed by the next most popular program, "Program C" at 9:00 PM and so on. In the illustration, the demand broadcast channel "Demand Broadcast Channel #1" 193 comprises five program selections, which are repeated beginning at 12:00 AM. While the demand broadcast channel "Demand Broadcast Channel #1" 193 in the example of FIG. 1D comprises the five most popular broadcast media channel program selections, the number or ordering is not a limitation of the present invention. In another embodiment, a demand broadcast channel such as, for example, "Demand Broadcast Channel #2" 194, may be offered using a repeating presentation of the single most popular program, in this case "Program D". In such an embodiment, the most popular program from the $3^{rd}$ party broadcast media channels 185 may be selected periodically (e.g., every 4 hours) and repeatedly broadcast until the next assessment of program popularity is made. In another embodiment of the present invention, a demand broadcast channel such as the demand broadcast channels 193, 194 of FIG. 1D may be created based upon direct viewer feedback or requests. This information may be conveyed to the provider of the demand broadcast channel, such as broadcast channel provider 136, through a media exchange network or through other means, without departing from the spirit of the present invention.

Figure 2:
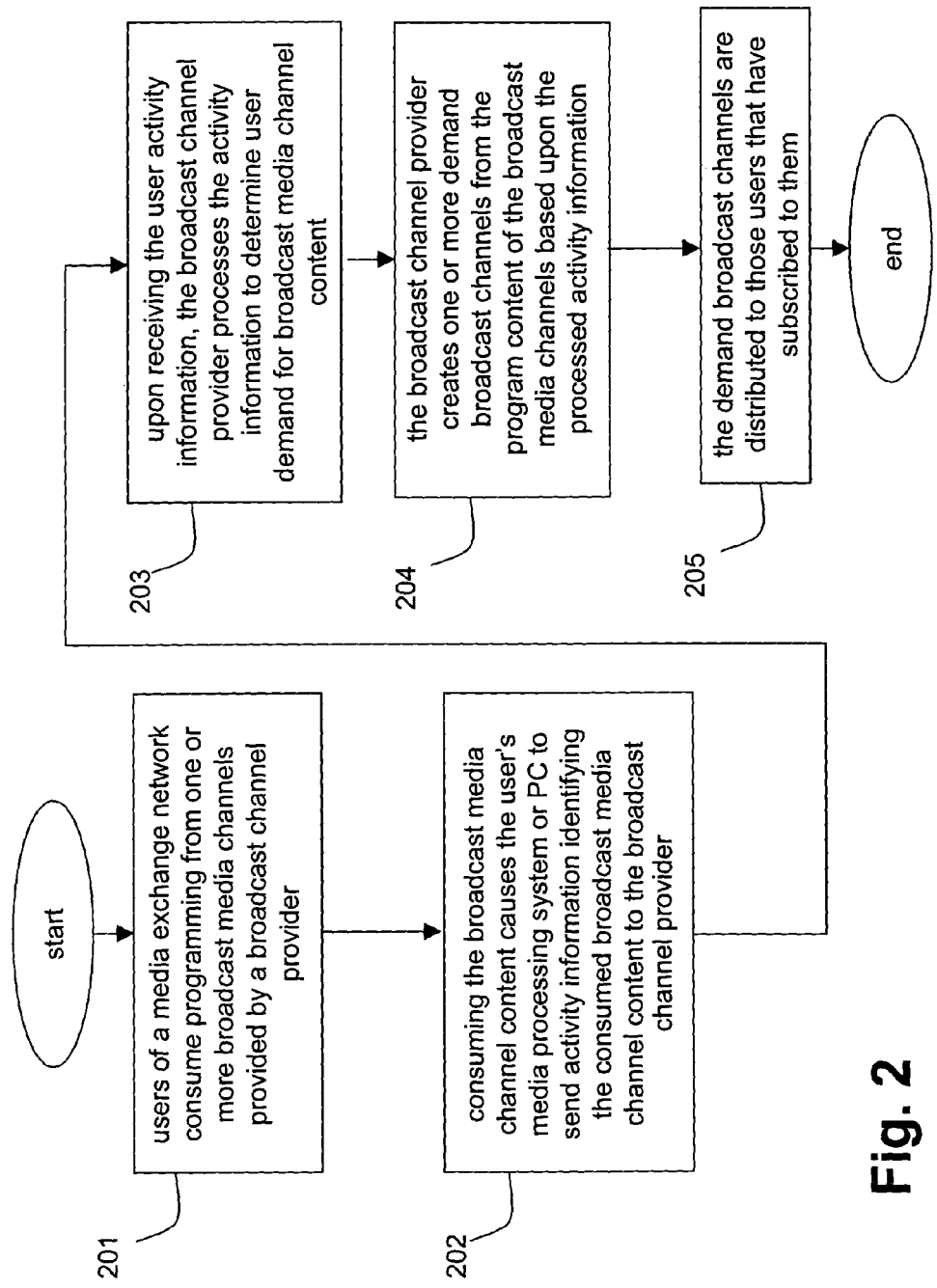
FIG. 2 is a flowchart illustrating an exemplary method of providing a demand broadcast channel in accordance with the present invention.

FIG. 2 is a flowchart illustrating an exemplary method of providing a demand broadcast channel in accordance with the present invention. The method illustrated in FIG. 2 is enabled when the users of a media exchange network such as media exchange network 130 of FIG. 1B, consume programming from one or more broadcast media channels provided by a broadcast channel provider such as broadcast channel provider 136 of FIG. 1B (block 201). Consuming the broadcast media channel content causes the user's media processing system or PC to send activity information identifying the consumed broadcast media channel content to the broadcast channel provider (block 202). Upon receiving the user activity information, the broadcast channel provider processes the activity information to determine user demand for broadcast media channel content (block 203). The broadcast channel provider then creates one or more demand broadcast channels from the program content of the broadcast media channels based upon the processed activity information (block 204). The demand broadcast channels are then distributed to those users that have subscribed to them (block 205).

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
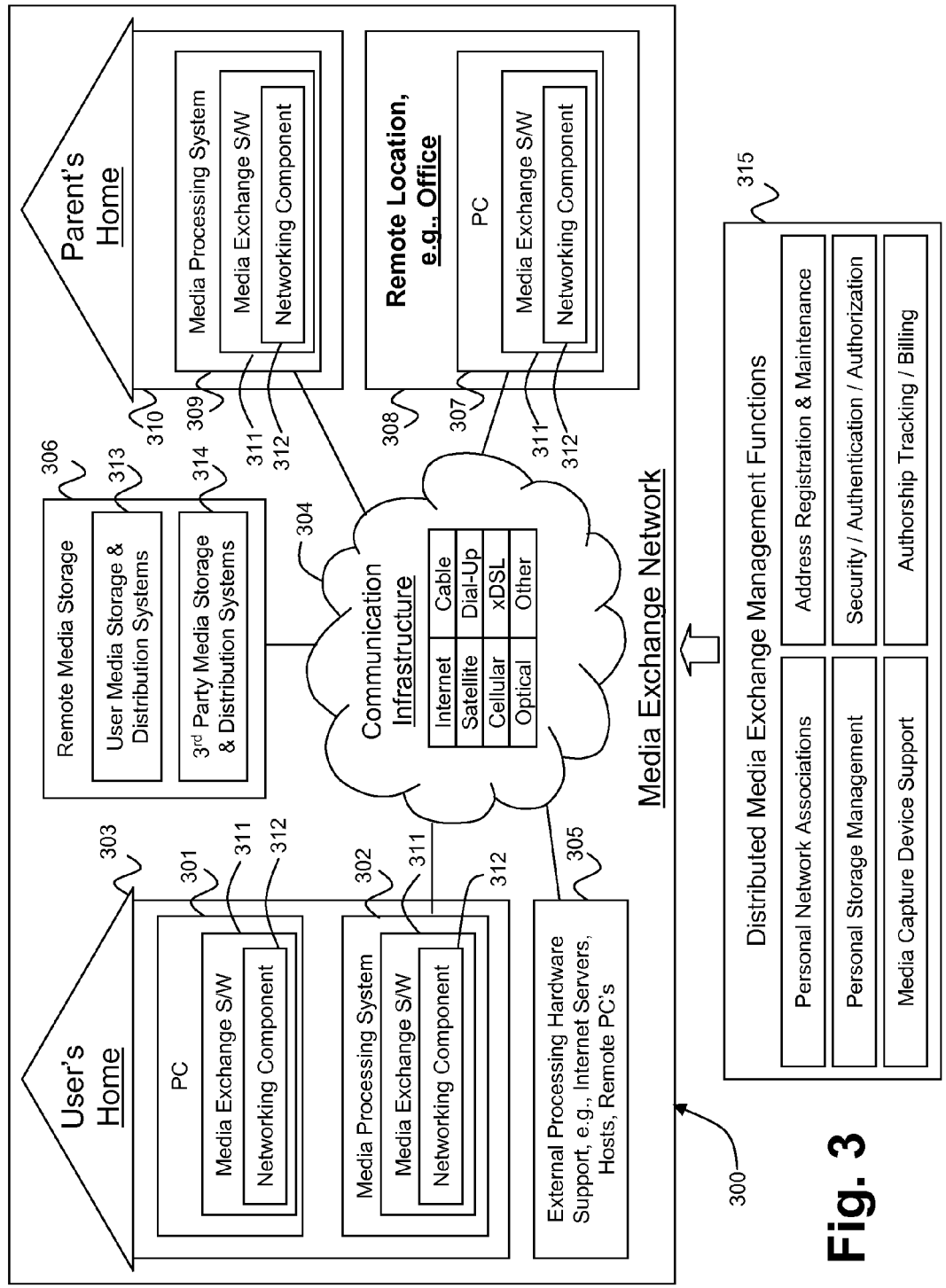
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface providing a TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
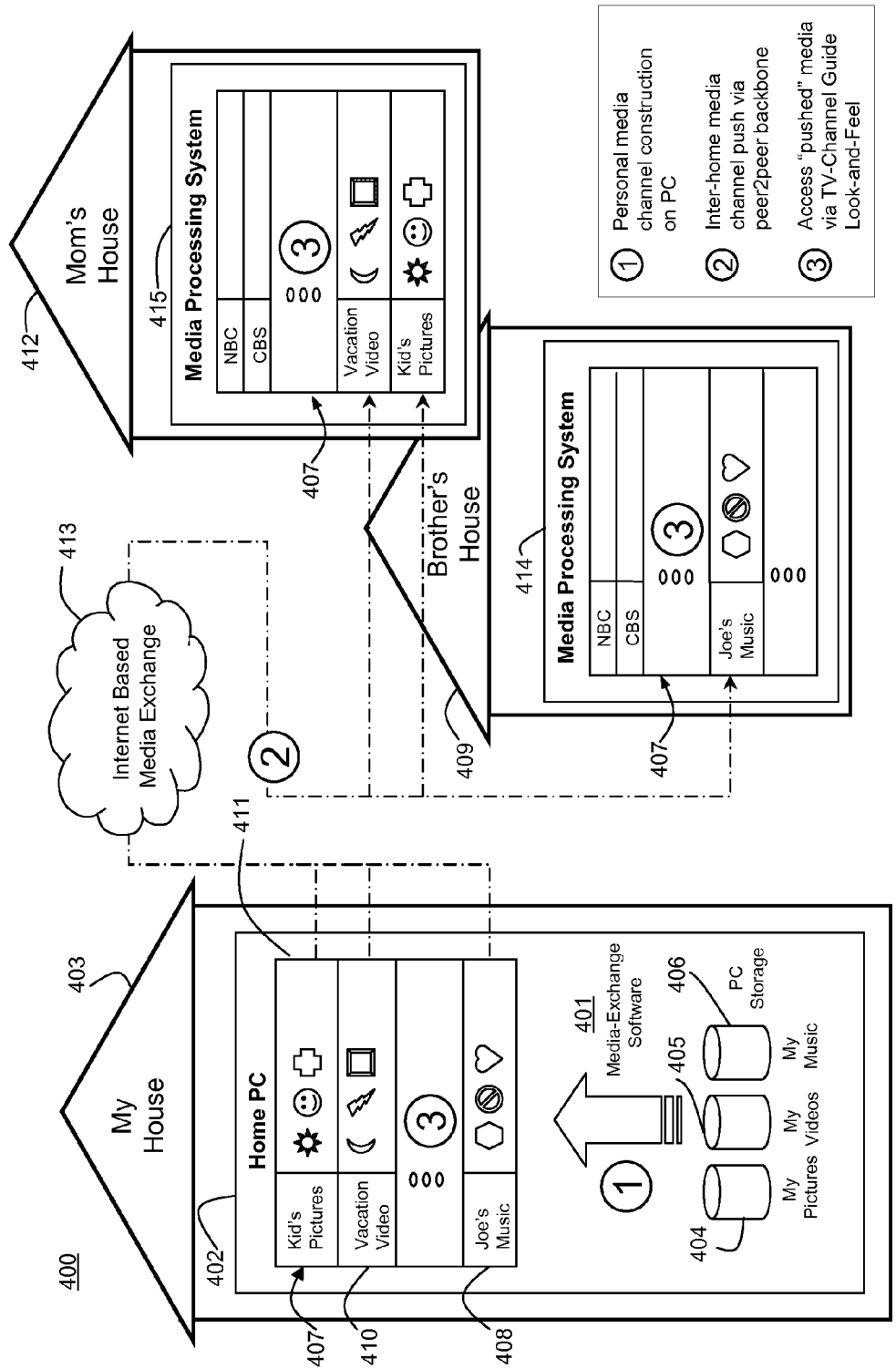
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
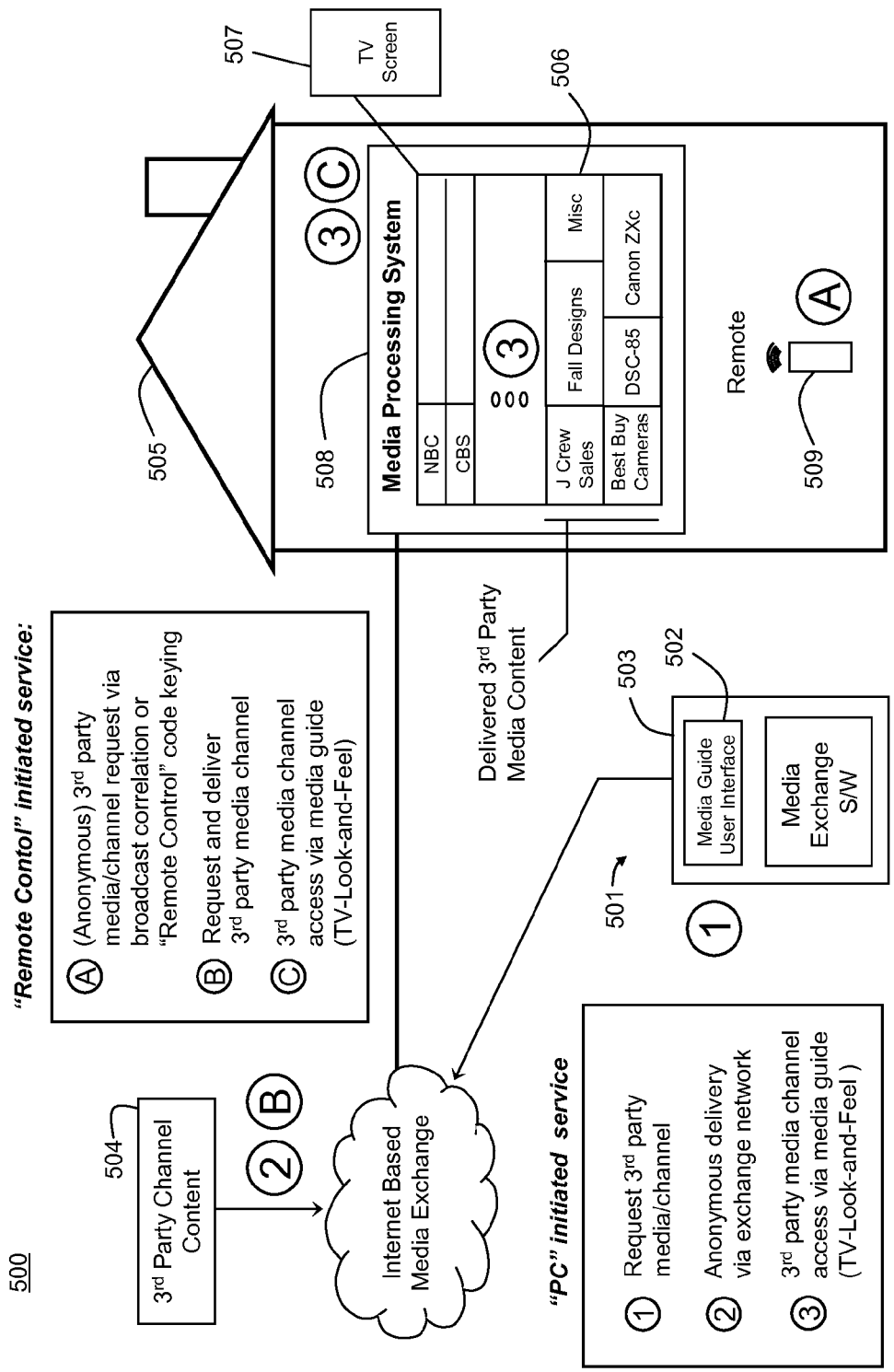
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
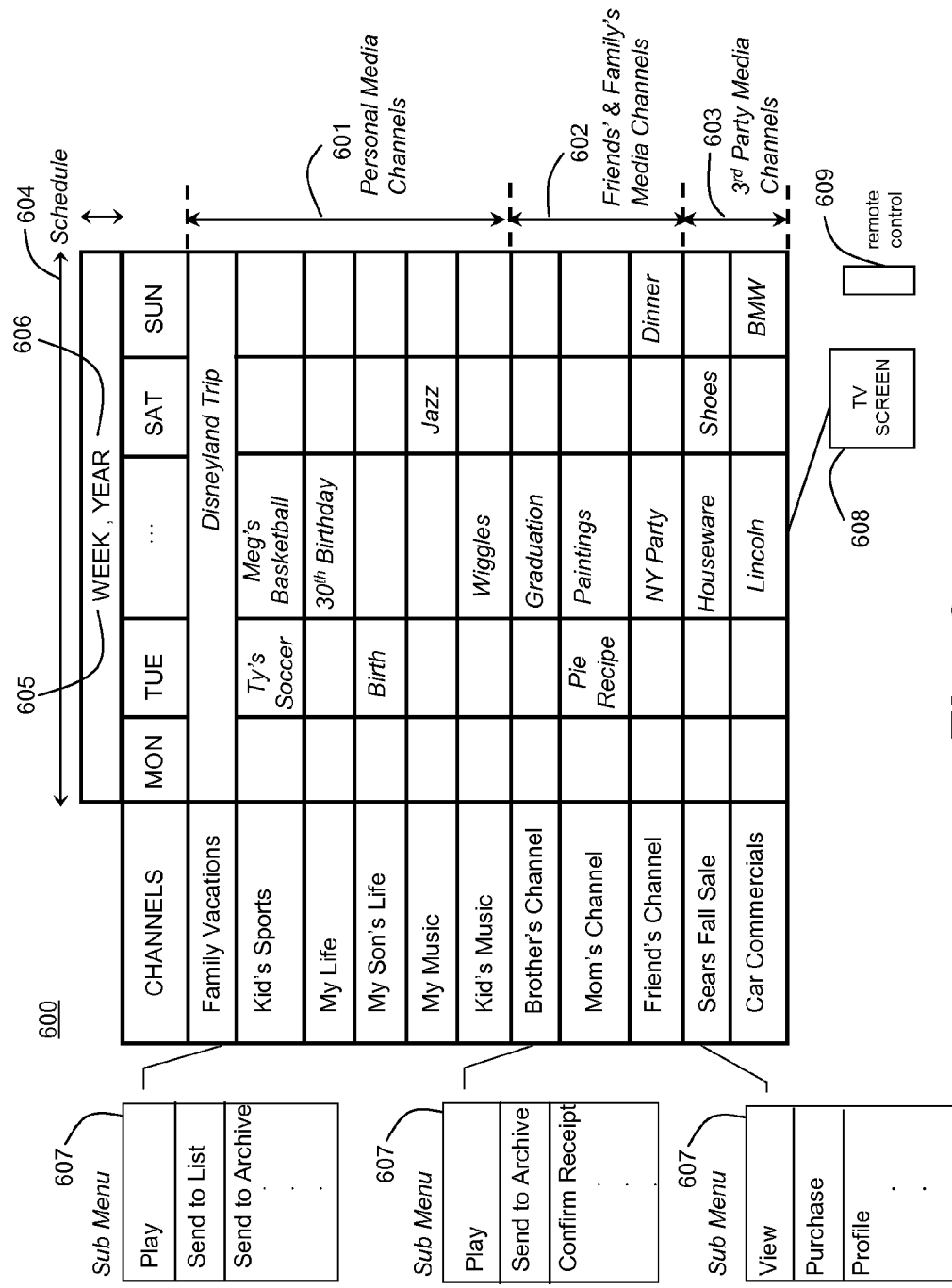
FIG. 6 is an exemplary illustration of a media guide user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609. Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
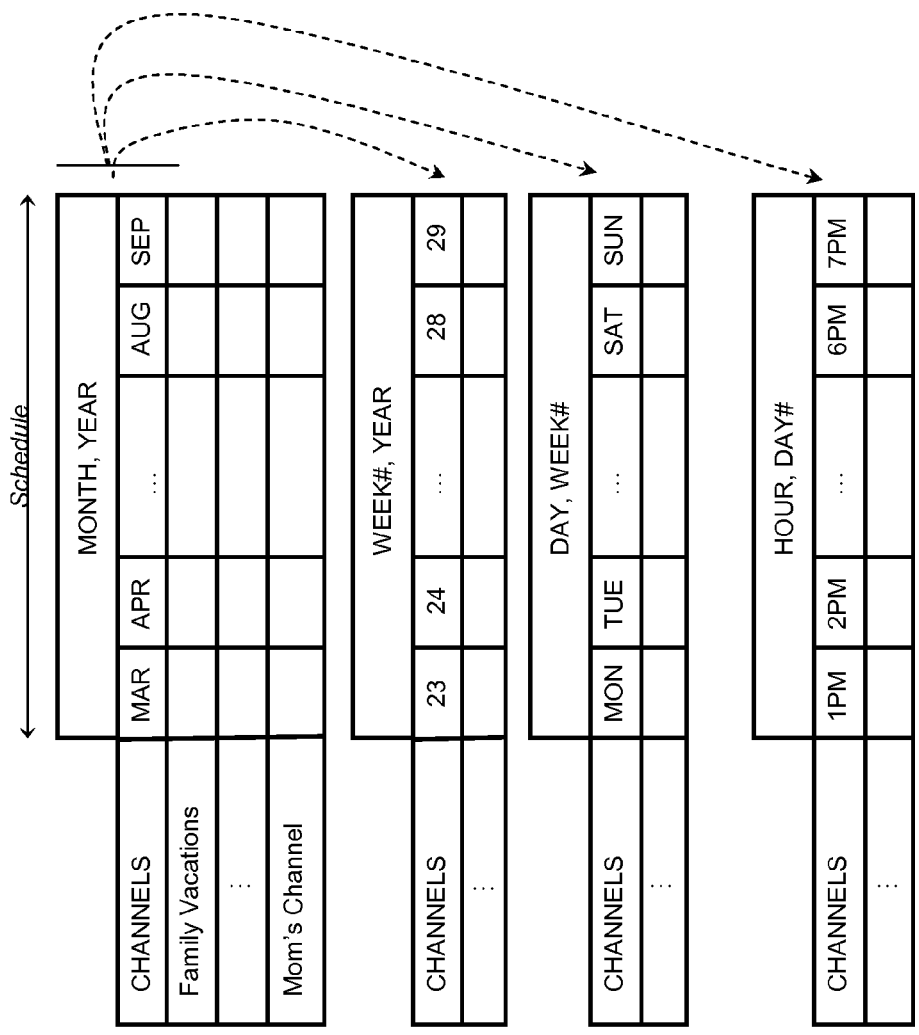
FIG. 7 is an exemplary illustration of several instantiations of a media guide user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
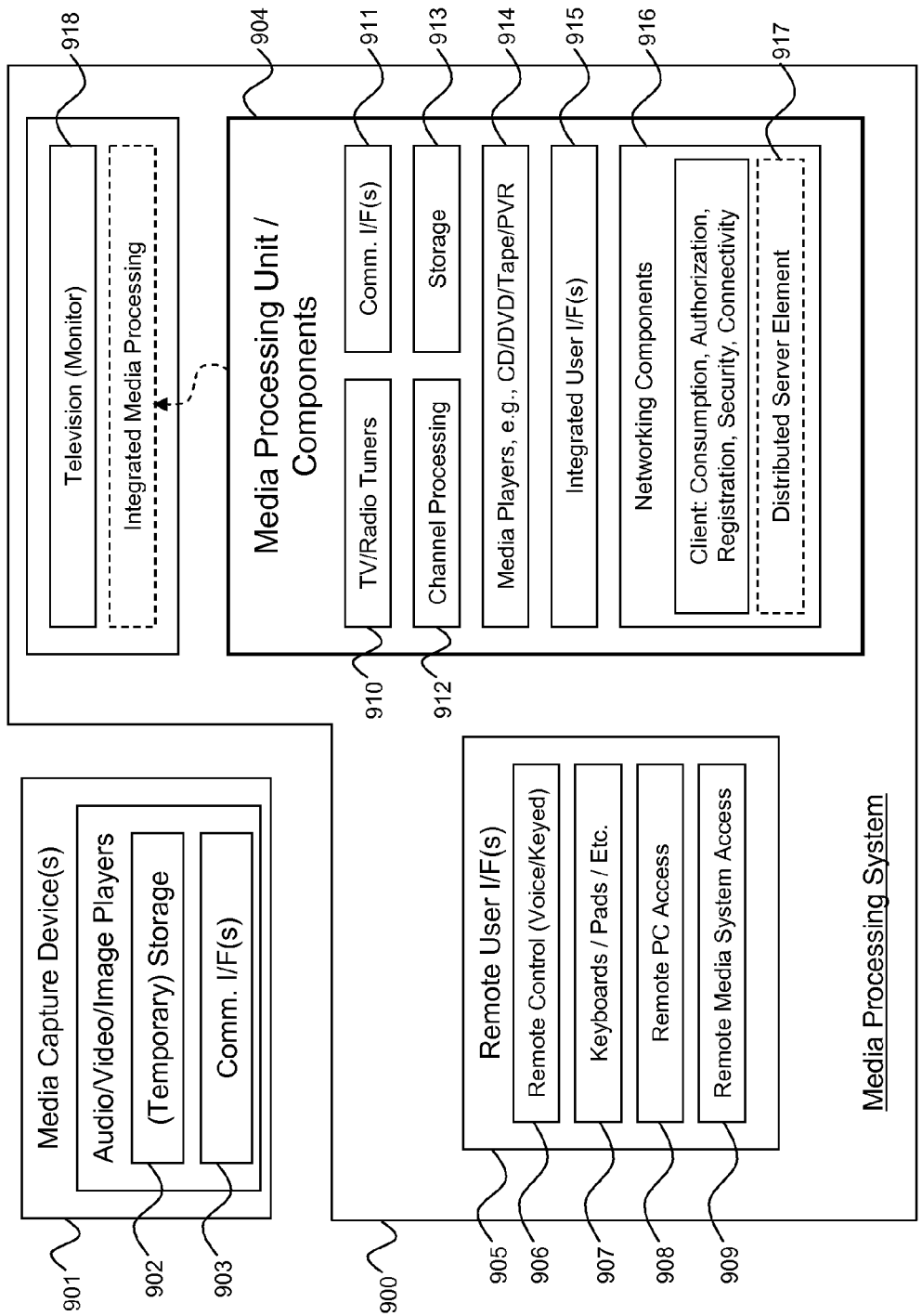
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
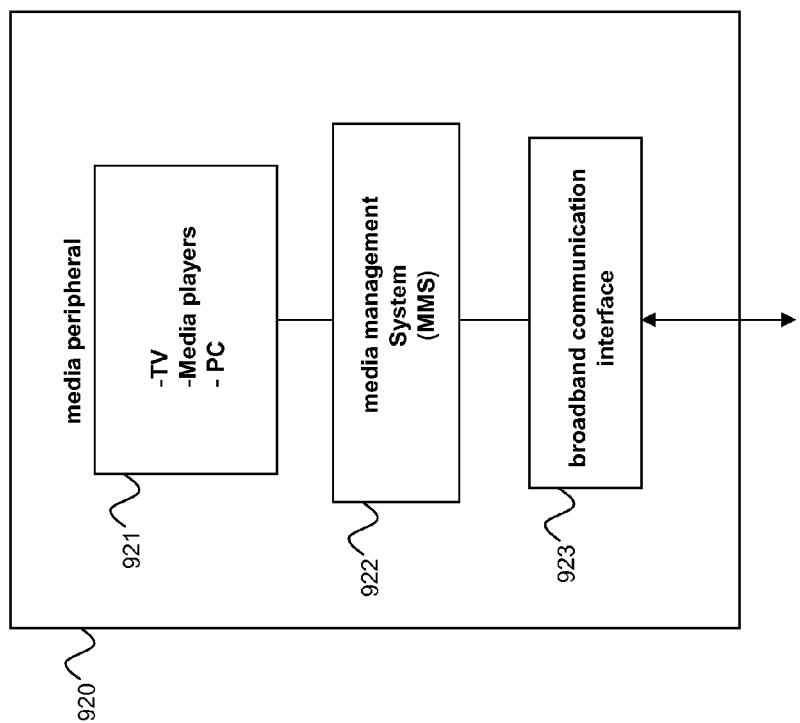
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
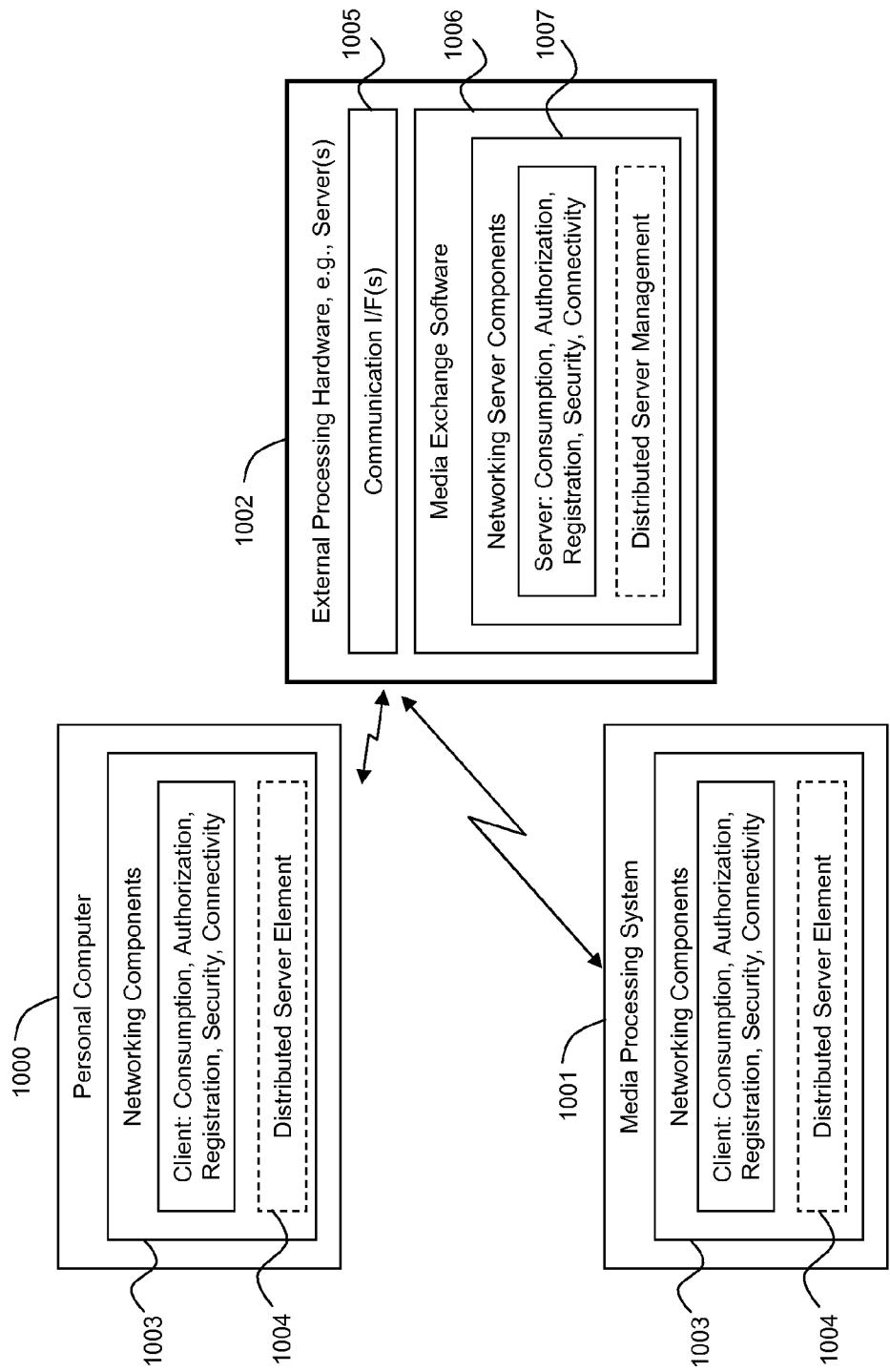
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
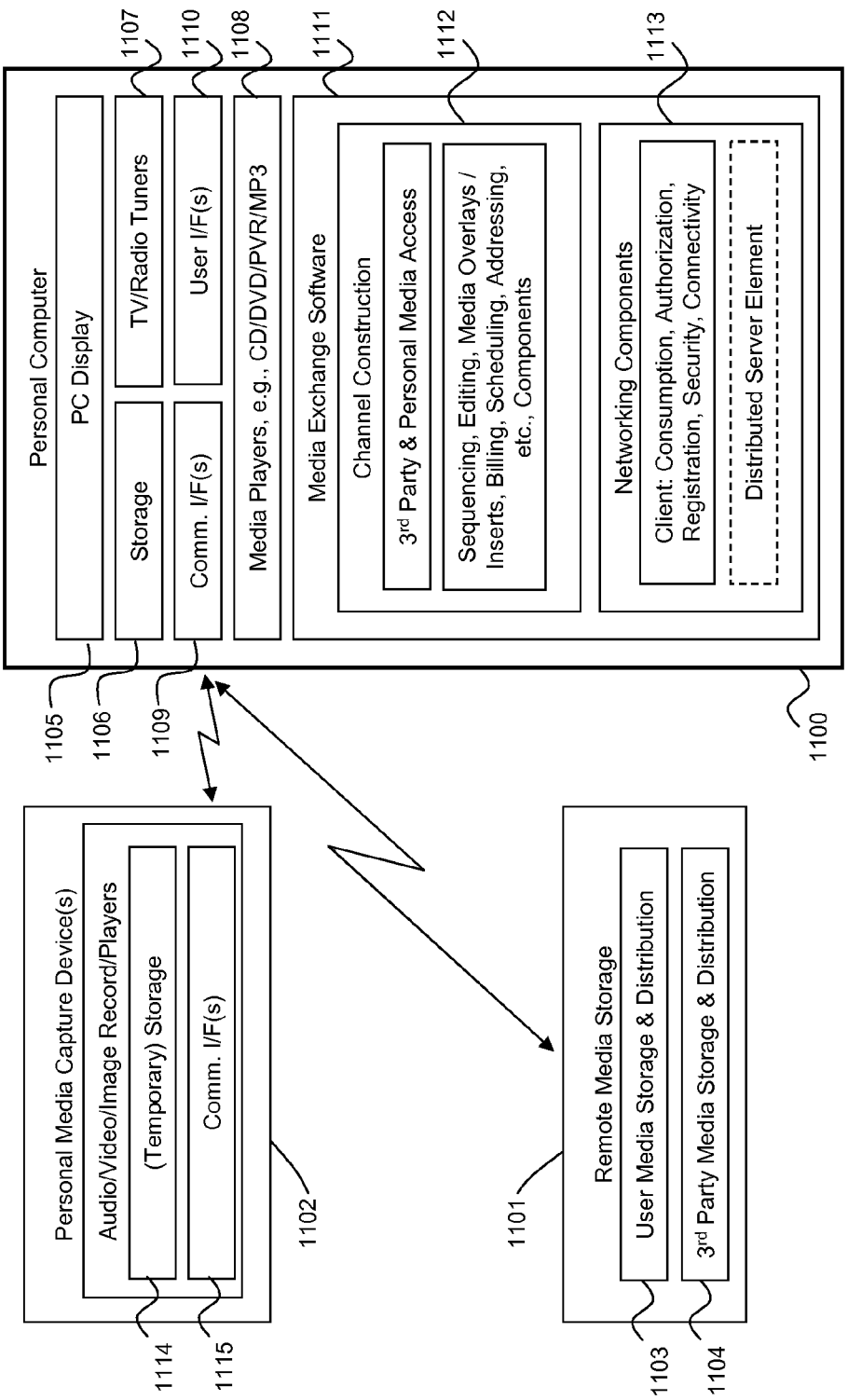
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

Various embodiments of the present invention include a system and method that provide demand broadcast channels and channel programming based on user viewing history, profiling, and requests.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method supporting communication of activity information to enable media programming, the method comprising:

receiving, at a user-designated electronic monitoring system via a communication network, at least one notification of a user request for consumption of media, each of the at least one notification comprising user-selected parameter information related to the request and at least one user-defined parameter that indicates a type of allowable use of the at least one notification by the monitoring system;

calculating at least one statistic, at the monitoring system, using the information related to the request;

automatically selecting additional media for consumption by the user according to the at least one statistic;

scheduling the selected additional media according to the at least one statistic, for consumption by the user via the communication network; and updating a user interface with the scheduled selected additional media.

2. The method of claim 1 wherein the information comprises one or more of an Internet protocol (IP) address, a media access control (MAC) address, an electronic serial number (ESN), a title, a subject, a time period, a genre, an artist, a media channel type, a mode, a language, and/or a user identifier.

3. The method of claim 1 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

4. The method of claim 1 wherein the communication network is the Internet.

5. The method of claim 1 wherein the media comprises one or more of audio, a still image, video, real time video, and/or data.

6. The method of claim 1 wherein consumption comprises one or more of playing audio, displaying a still image, displaying video, and/or displaying data.

7. The method of claim 1 wherein one or more of the calculating, selecting, scheduling, and/or updating is performed on a periodic basis.

8. The method of claim 1 wherein the at least one statistic is a ranking of the relative frequency of consumption of media.

9. A method supporting communication of activity information to enable media programming, the method comprising:

receiving, at a user-designated electronic monitoring system via a communication network, at least one notification of a user request for consumption of media, each of the at least one notification comprising user-selected parameter information related to the request and at least one user-defined parameter that indicates a type of allowable use of the at least one notification by the monitoring system;

calculating at least one statistic, at the monitoring system, using the information related to the request;

automatically selecting additional media for consumption by the user according to the at least one statistic;

scheduling the selected additional media according to the at least one statistic for consumption by the user; and communicating one or both of the selected additional media and/or the at least one statistic to a provider of the media, via the communication network.

10. The method of claim 9 wherein the information related to the request comprises one or more of an Internet protocol (IP) address, a media access control (MAC) address, an electronic serial number (ESN), a title, a subject, a time period, a genre, an artist, a media channel type, a mode, a language, and/or a user identifier.

11. The method of claim 9 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

12. The method of claim 9 wherein the communication network is the Internet.

13. The method of claim 9 wherein the media comprises one or more of audio, a still image, video, real time video, and/or data.

14. The method of claim 9 wherein consumption comprises one or more of playing audio, displaying a still image, displaying video, and/or displaying data.

15. The method of claim 9 wherein one or more of the calculating, selecting, and/or communicating is performed on a periodic basis.

16. The method of claim 9 wherein the at least one statistic is a ranking of the relative frequency of consumption of media.

17. A system for monitoring activity information to enable media programming, the system comprising:

at least one processor communicatively coupled to a communication network, the at least one processor operable to, at least:

receive, via the communication network, at least one notification of a user request for consumption of media, each of the at least one notification comprising user-selected parameter information related to the request and at least one user-defined parameter that indicates a type of allowable use of the at least one notification by the monitoring system, wherein the system receiving the at least one notification is designated by the user;

calculate at least one statistic using the information related to the request;

automatically select additional media for consumption by the user according to the at least one statistic;

schedule the selected additional media according to the at least one statistic, for consumption by the user via the communication network; and update a user interface with the scheduled selected additional media.

18. The system of claim 17 wherein the information comprises one or more of an Internet protocol (IP) address, a media access control (MAC) address, an electronic serial number (ESN), a title, a subject, a time period, a genre, an artist, a media channel type, a mode, a language, and/or a user identifier.

19. The system of claim 17 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

20. The system of claim 17 wherein the communication network is the Internet.

21. The system of claim 17 wherein the media comprises one or more of audio, a still image, video, real time video, and/or data.

22. The system of claim 17 wherein consumption comprises one or more of playing audio, displaying a still image, displaying video, and/or displaying data.

23. The system of claim 17 wherein one or more of the calculating, selecting, scheduling, and/or updating is performed on a periodic basis.

24. The system of claim 17 wherein the at least one statistic is a ranking of the relative frequency of consumption of media.

25. A system for monitoring activity information to enable media programming, the system comprising:
- at least one processor communicatively coupled to a communication network, the at least one processor operable to, at least:
  - receive, via the communication network, at least one notification of a user request for consumption of media, each of the at least one notification comprising user-selected parameter information related to the request and at least one user-defined parameter that indicates a type of allowable use of the at least one notification by the monitoring system, wherein the system receiving the at least one notification is designated by the user;
  - calculate at least one statistic using the information related to the request;
  - automatically select additional media for consumption by the user according to the at least one statistic;
  - schedule the selected additional media according to the at least one statistic for consumption by the user; and
  - communicate one or both of the selected additional media and/or the at least one statistic to a provider of the media, via the communication network.

26. The system of claim 25 wherein the information related to the request comprises one or more of an Internet protocol (IP) address, a media access control (MAC) address, an electronic serial number (ESN), a title, a subject, a time period, a genre, an artist, a media channel type, a mode, a language, and/or a user identifier.

27. The system of claim 25 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

28. The system of claim 25 wherein the communication network is the Internet.

29. The system of claim 25 wherein the media comprises one or more of audio, a still image, video, real time video, and/or data.

30. The system of claim 25 wherein consumption comprises one or more of playing audio, displaying a still image, displaying video, and/or displaying data.

31. The system of claim 25 wherein one or more of the calculating, selecting, and/or communicating is performed on a periodic basis.

32. The system of claim 25 wherein the at least one statistic is a ranking of the relative frequency of consumption of media.

* * * * *

UNITED STATES PATENT AND TRADEMARK OFFICE
CERTIFICATE OF CORRECTION

| | | |
|---|---|---|
| PATENT NO. | : 7,958,525 B2 | Page 1 of 1 |
| APPLICATION NO. | : 10/675466 | |
| DATED | : June 7, 2011 | |
| INVENTOR(S) | : Jeyhan Karaoguz et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1287 days.

Signed and Sealed this
Twentieth Day of December, 2011

David J. Kappos
*Director of the United States Patent and Trademark Office*